(12) United States Patent
Wong (10) Patent No.: US 10,627,487 B2
(45) Date of Patent: Apr. 21, 2020

(54) ENCLOSURE

(71) Applicant: Delphi Technologies, LLC, Troy, MI (US)

(72) Inventor: Celine W K Wong, Kokomo, IN (US)

(73) Assignee: DELPHI TECHNOLOGIES, LLC, Troy, MI (US)

( * ) Notice: Subject to any disclaimer, the term of this patent is extended or adjusted under 35 U.S.C. 154(b) by 60 days.

(21) Appl. No.: 15/897,696

(22) Filed: Feb. 15, 2018

(65) Prior Publication Data

US 2019/0250252 A1 Aug. 15, 2019

Related U.S. Application Data

(60) Provisional application No. 62/628,947, filed on Feb. 10, 2018.

(51) Int. Cl.
G01S 7/481 (2006.01)
B32B 27/28 (2006.01)
B32B 27/08 (2006.01)
G01S 17/93 (2020.01)

(52) U.S. Cl.
CPC .......... G01S 7/4813 (2013.01); B32B 27/08 (2013.01); B32B 27/283 (2013.01); G01S 17/936 (2013.01); *B32B 2307/412* (2013.01); *B32B 2307/42* (2013.01)

(58) Field of Classification Search
CPC ..... G01S 7/4813; B32B 27/283; B32B 27/08; B32B 2307/42; B32B 2307/412
See application file for complete search history.

(56) References Cited

U.S. PATENT DOCUMENTS

| | | | |
|---|---|---|---|
| 4,687,337 A * | 8/1987 | Stewart | G01N 21/534 250/345 |
| 10,281,923 B2 * | 5/2019 | Boehmke | G01S 7/4815 |
| 2004/0042721 A1 * | 3/2004 | Kroupenkine | G02B 6/02052 385/37 |
| 2012/0286136 A1 * | 11/2012 | Krill | G01S 17/42 250/206 |
| 2014/0049983 A1 * | 2/2014 | Nichol | G02B 6/0018 362/610 |
| 2015/0115139 A1 * | 4/2015 | Okushiba | G01S 7/4813 250/216 |
| 2016/0291134 A1 * | 10/2016 | Droz | G01S 7/4817 |
| 2017/0297206 A1 | 10/2017 | Correll | |

(Continued)

FOREIGN PATENT DOCUMENTS

| | | |
|---|---|---|
| JP | 2004198617 A | 7/2004 |
| WO | 2017183145 A1 | 10/2017 |

OTHER PUBLICATIONS

European Search Report for Application No. 19155816.2, European Patent Office, dated Jun. 11, 2019.

*Primary Examiner* — Francis C Gray (74) *Attorney, Agent, or Firm* — Joseph V. Bonadies (57) ABSTRACT

An enclosure, includes a housing and a window. The housing is configured to retain a LIDAR-sensor. The window is attached to the housing within an opening defined by the housing. The window is configured to transmit light from the LIDAR-sensor. The window is comprised of a silicone-based polymeric material having a thickness of at least three millimeters. The window is characterized as having a transmittance of at least 80% of the light at a wavelength of 1550 nanometers.

22 Claims, 7 Drawing Sheets

(56) References Cited

U.S. PATENT DOCUMENTS

| | | | |
|---|---|---|---|
| 2018/0120435 A1* | 5/2018 | Decker | C09D 5/38 |
| 2018/0329035 A1* | 11/2018 | Pacala | G02B 27/0955 |
| 2019/0049716 A1* | 2/2019 | Heitzer | G02B 26/0833 |
| 2019/0137259 A1 | 5/2019 | Mori et al. | |
| 2019/0162887 A1* | 5/2019 | Shimizu | G02B 5/281 |

* cited by examiner

ENCLOSURE

TECHNICAL FIELD OF INVENTION

This disclosure generally relates to an enclosure, and more particularly relates to an enclosure that houses a LIDAR-sensor.

BRIEF DESCRIPTION OF DRAWINGS

The present invention will now be described, by way of example with reference to the accompanying drawings, in which.

The reference numbers of similar elements in the embodiments shown in the various figures share the last two digits.

DETAILED DESCRIPTION

Figure 1:
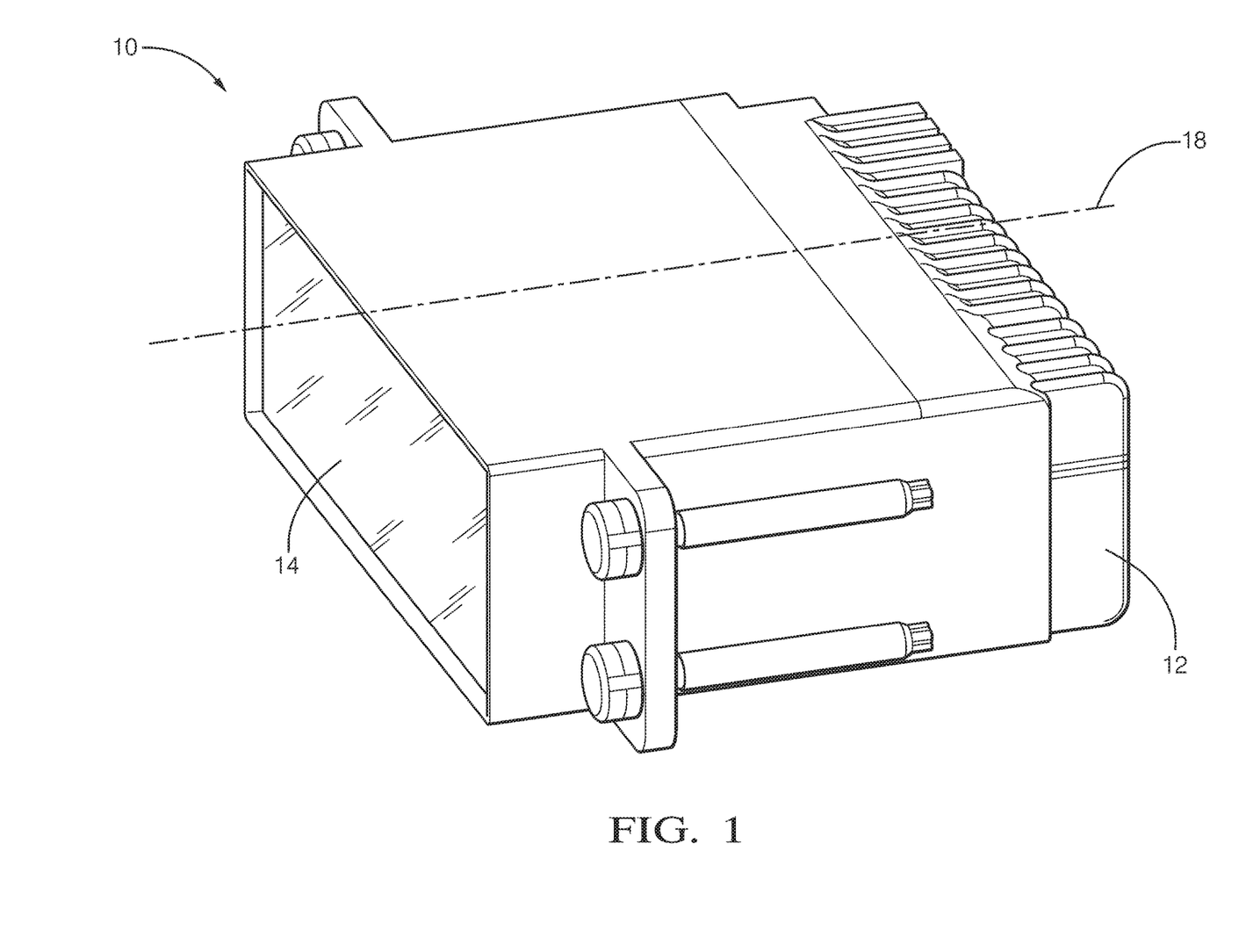
FIG. 1 is an illustration of an enclosure in accordance with one embodiment.

FIG. 1 illustrates a non-limiting example of an enclosure 10. The enclosure 10 includes a housing 12 and a window 14. The housing 12 is configured to retain a LIDAR-sensor 16 (see FIG. 2) and is formed of an aluminum-based alloy. The LIDAR-sensor 16 may be any LIDAR-sensor 16 suitable for use in an automotive application. The enclosure 10 may be mounted to a front-end of an automobile and may be exposed to hard projectiles such as gravel and/or road salt, as will be appreciated by those in the art.

Figure 2:
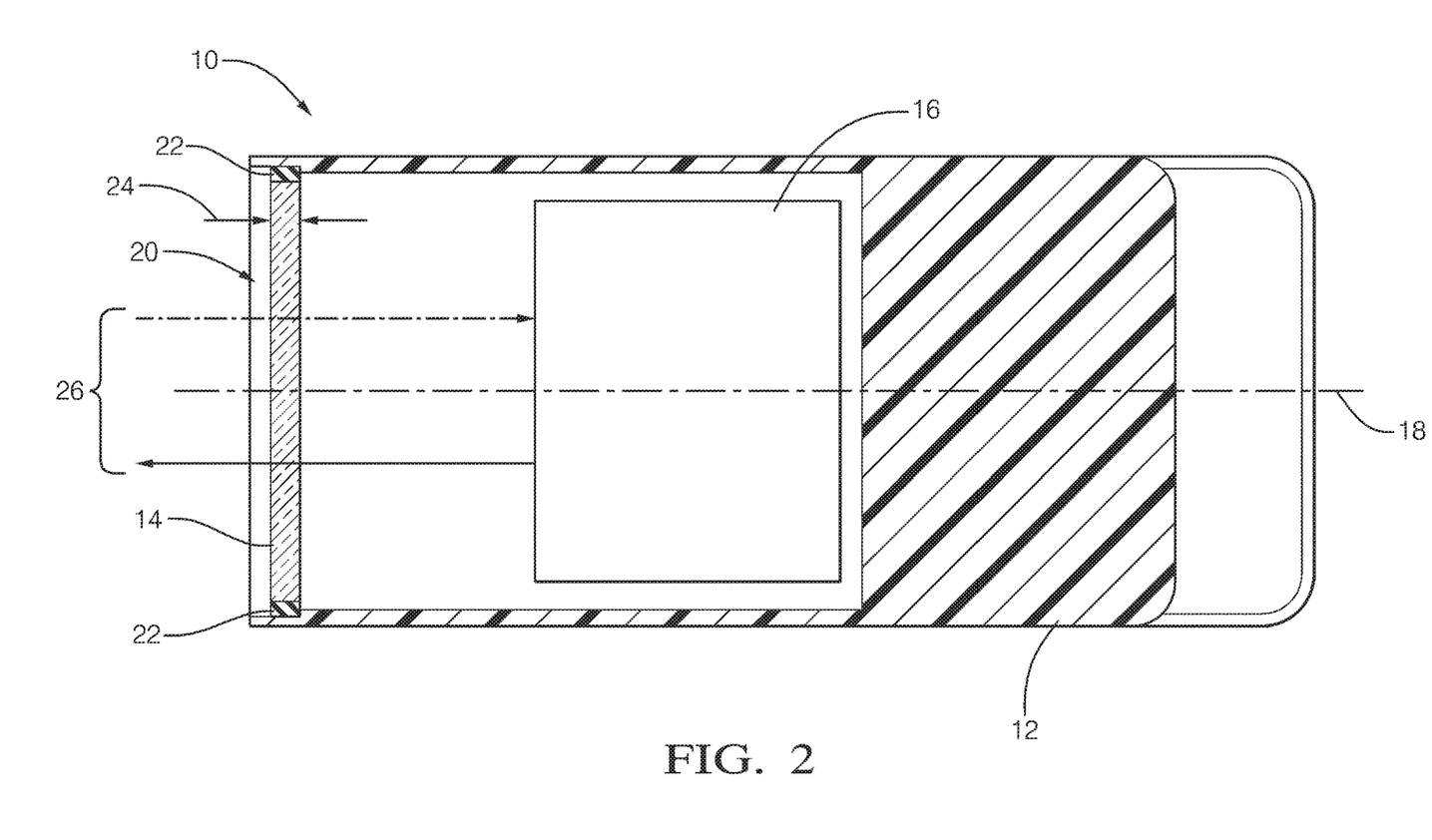
FIG. 2 is a section view of the enclosure of FIG. 1 in accordance with one embodiment.

FIG. 2 illustrates a section-view of the enclosure 10 along a longitudinal-axis 18. The window 14 is attached to the housing 12 within an opening 20 defined by the housing 12 using a silicone-based adhesive 22 suitable for exterior automotive applications. One such adhesive 22 is the Dow Corning® 773 Glass & Metal Sealant, manufactured by the Dow Corning Corporation, of Midland, Mich., USA. Clearances between edges of the window 14 and the housing 12 are determined based on differences in thermal coefficients of expansion (TCE) of both the window 14 and the housing 12, wherein the adhesive 22 accommodates a mismatch in the TCE and fills any voids between the window 14 and the housing 12 maintaining a bond therebetween. Experimentation by the inventor has discovered that the thickness 24 of at least 3 mm provides a sufficient balance between optical and mechanical properties of the window 14, and the thickness 24 of the window 14 illustrated in FIG. 2 is three millimeters (3 mm).

Figure 3:
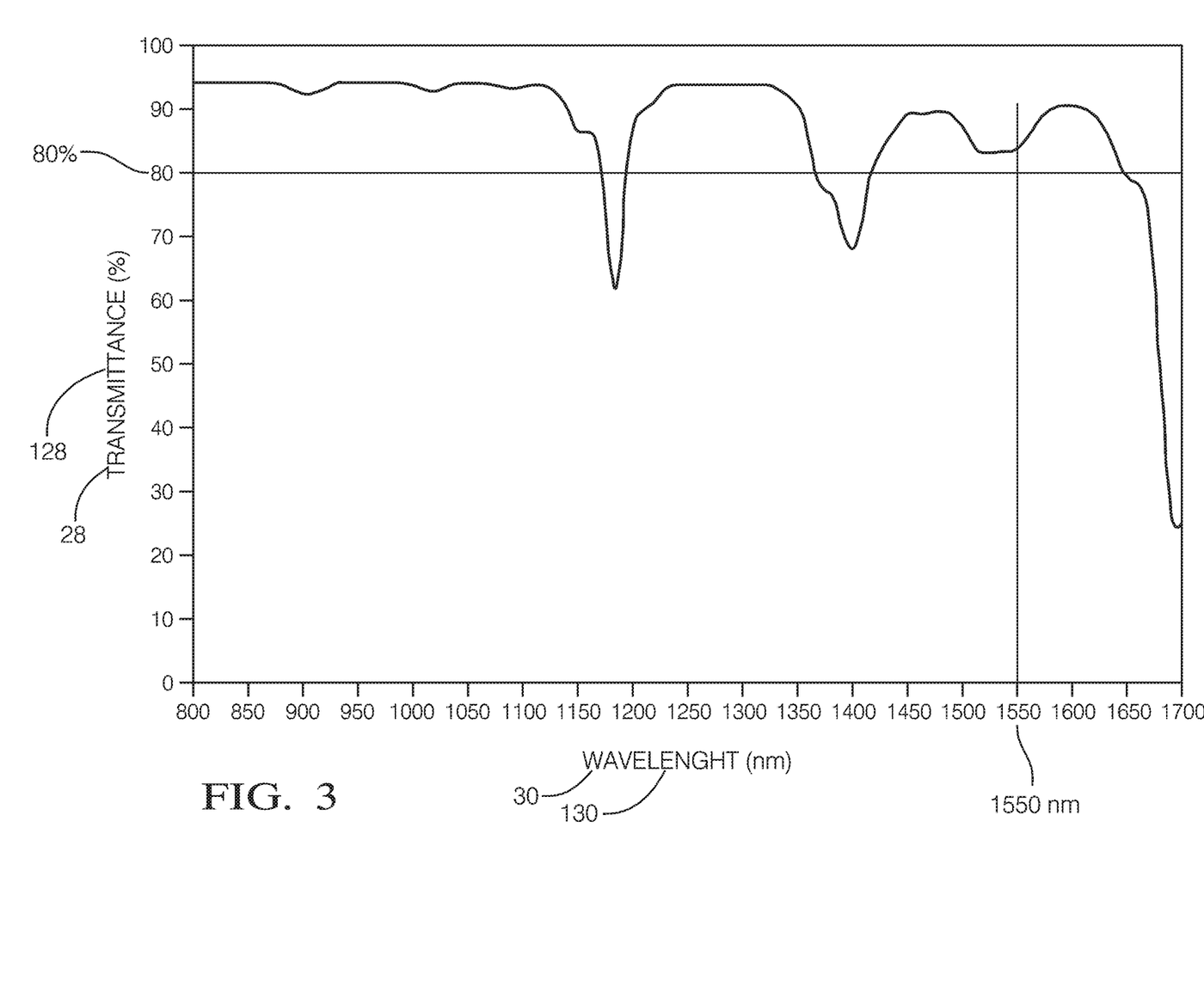
FIG. 3 is a plot illustrating transmittance versus wavelength in accordance with one embodiment.

FIG. 3 is a plot of the optical property transmittance 28 (zero degree incident-angle) versus a wavelength 30 of light 26 for a sample of window-material tested. The window 14 is configured to transmit light 26 originating from the LIDAR-sensor 16 to targets proximate to the automobile, as well as transmit the light 26 that is reflected back from the targets to the LIDAR-sensor 16. Experimentation by the inventor has discovered that the transmittance 28 greater than 80% at the wavelength 30 of 1550 nanometers (1550 nm) is sufficient for LIDAR-sensor 16 automotive applications.

Referring back to FIG. 2, the window 14 is comprised of a single silicone-based polymeric material, and in particular is a transparent polydimethylsiloxane material having a Shore A durometer of not greater than 85. One such material is the Dow Corning® MS-4022 Moldable Silicone, manufactured by the Dow Corning Corporation, of Midland, Mich., USA. The window 14 is characterized as having the zero degree incident-angle transmittance 28 of at least 80% at the wavelength 30 of 1550 nanometers. Anti-reflective coatings may also be applied to an interior-surface of the window 14 to further increase the transmittance 28.

In the examples illustrated in FIGS. 1 and 2, the window 14 is characterized as having a flat or planar shape. The window 14 may also be characterized as having a convex-curvature (i.e. curved away from an interior of the housing 12—not shown), or may be characterized as having a concave-curvature (i.e. curved in toward the interior of the housing 12—not shown). The planes of curvature may be in any or both of the two planes that are transverse to the longitudinal-axis 18. The convex-curvature and/or the concave-curvature provide a technical benefit of enabling the mounting of the enclosure 10 in a body-member of the automobile where the body-member has a curved-surface.

Figure 4A:
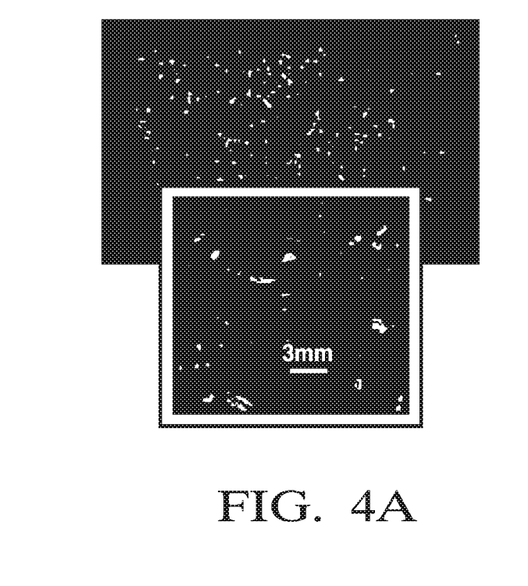
FIG. 4A is a photograph illustrating surface chipping in accordance with one embodiment.
Figure 4B:
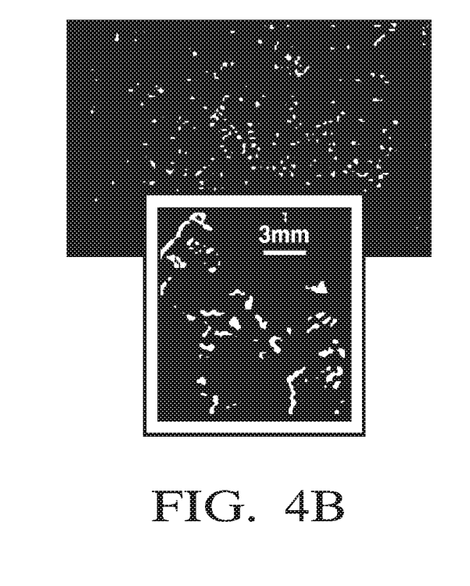
FIG. 4B is a photograph illustrating surface chipping in accordance with one embodiment.
Figure 4C:
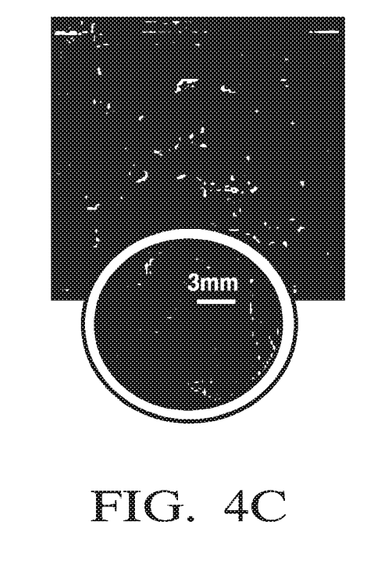
FIG. 4C is a photograph illustrating surface chipping in accordance with one embodiment.

FIGS. 4A-4C illustrate three different window-materials after being subjected to a test for chip resistance defined by SAE International Standard J400 OCT2012 (SAE J400_2012-10), which is incorporated in its entirety herein by reference. FIG. 4A illustrates chipping on a surface of a hard-coated polycarbonate window-material that was measured to have 80-chips in the test area as defined by the test specification, with an associated Rating Number of 3 (see Table 1—Number Categories For Chip Rating, SAE J400_2012-10). FIG. 4B illustrates the chipping on the surface of an un-coated polycarbonate window-material that was measured to have 150-chips in the test area, with an associated Rating Number of 1. FIG. 4C illustrates the surface of the polydimethylsiloxane material window-material that was measured to have-zero chips in the test area, with an associated Rating Number of 10 (the highest ranking possible on the test), with only minor scuffing visible on the surface.

Figure 5:
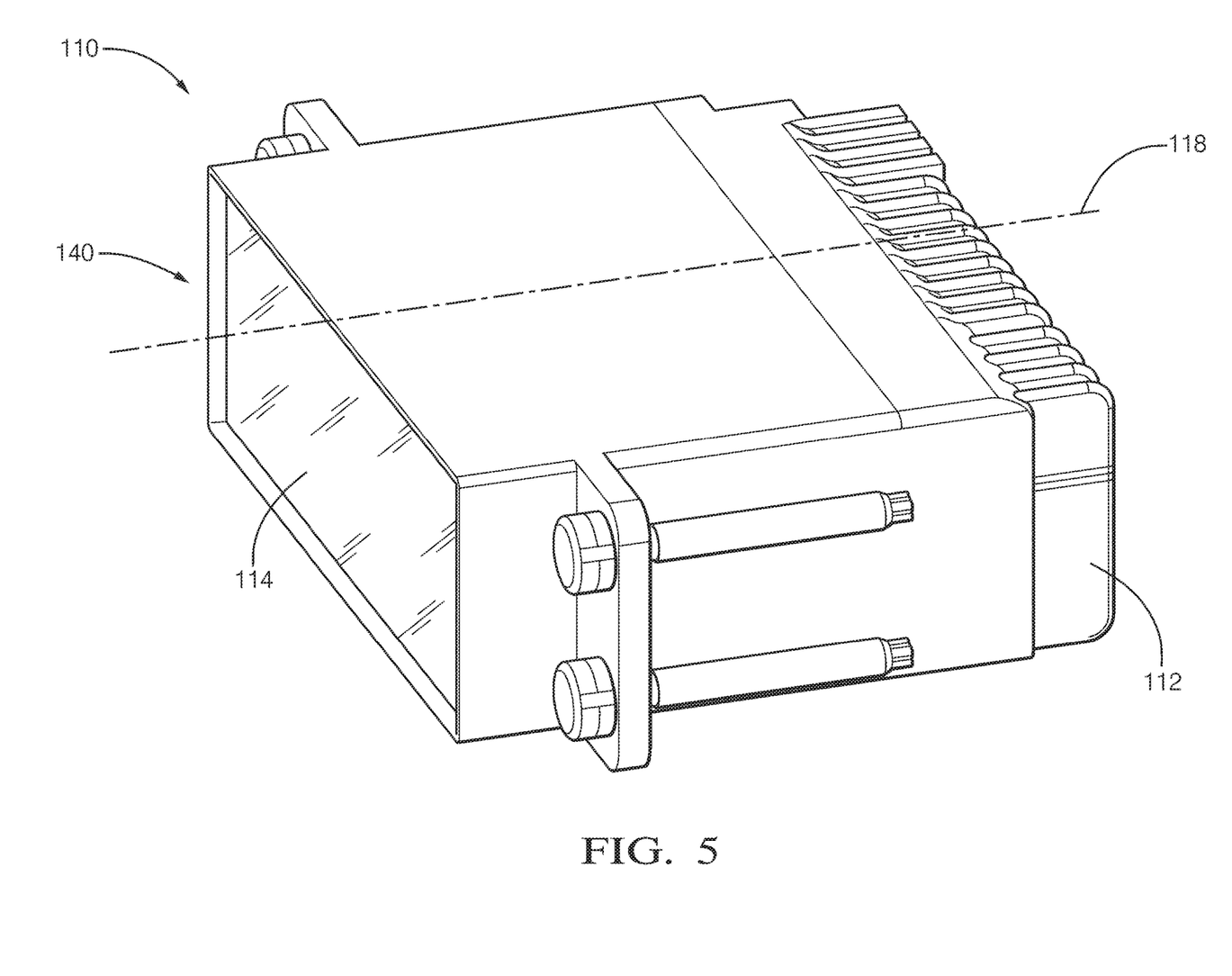
FIG. 5 is an illustration of an enclosure in accordance with another embodiment.

FIG. 5 illustrates another embodiment of an enclosure 110. The enclosure 110 includes a housing 112 and a window 114. The housing 112 is configured to retain a LIDAR-sensor 116 (see FIG. 6) and is formed of an aluminum-based alloy. The LIDAR-sensor 116 may be any LIDAR-sensor 116 suitable for use in an automotive application. The enclosure 110 may be mounted to a front-end of an automobile and may be exposed to hard projectiles such as gravel and/or road salt, as will be appreciated by those in the art.

Figure 6:
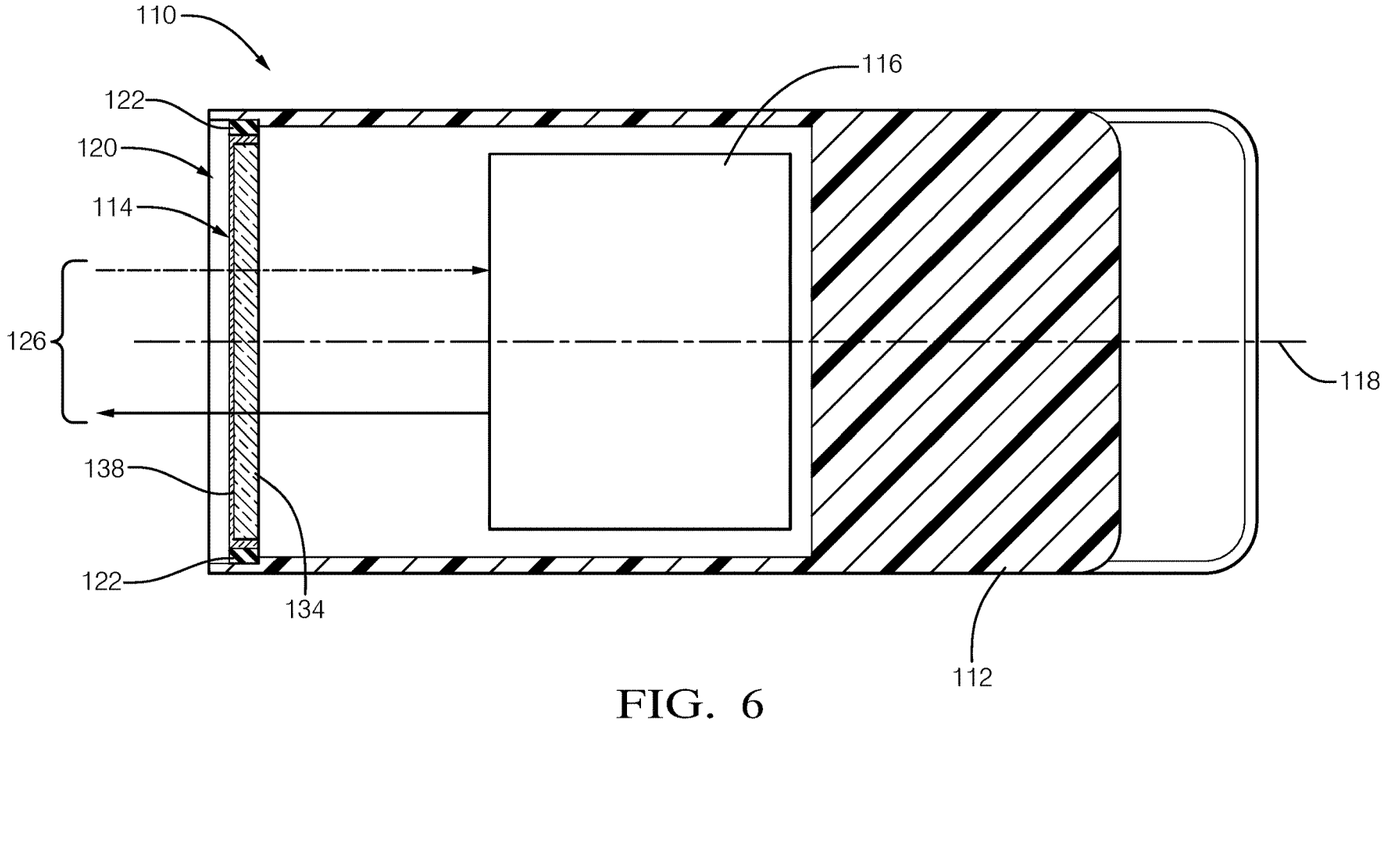
FIG. 6 is a section view of the enclosure of FIG. 5 in accordance with another embodiment.

FIG. 6 illustrates a section-view of the enclosure 110 along a longitudinal-axis 118. The window 114 is attached to the housing 112 within an opening 120 defined by the housing 112 using a silicone-based adhesive 122 suitable for exterior automotive applications. One such adhesive 122 is the Dow Corning® 773 Glass & Metal Sealant, manufactured by the Dow Corning Corporation, of Midland, Mich., USA. Clearances between edges of the window 114 and the housing 112 are determined based on differences in thermal coefficients of expansion (TCE) of both the window 114 and the housing 112, wherein the adhesive 122 accommodates a mismatch in the TCE and fills any voids between the window 114 and the housing 112 maintaining a bond therebetween. The window 114 is configured to transmit light 126 originating from the LIDAR-sensor 116 to targets proximate to the automobile, as well as transmit the light 126 that is reflected back from the targets to the LIDAR-sensor 116. Experimentation by the inventor has discovered that a transmittance 128 greater than 80% at a wavelength 130 of 1550 nanometers (1550 nm) is sufficient for LIDAR-sensor 116 applications. The window 114 includes a first-layer 134 oriented toward an interior of the housing 112, and a second-layer 138 overlaying the first-layer 134 and oriented toward an exterior of the housing 112, as will be described in more detail below.

Figure 7:
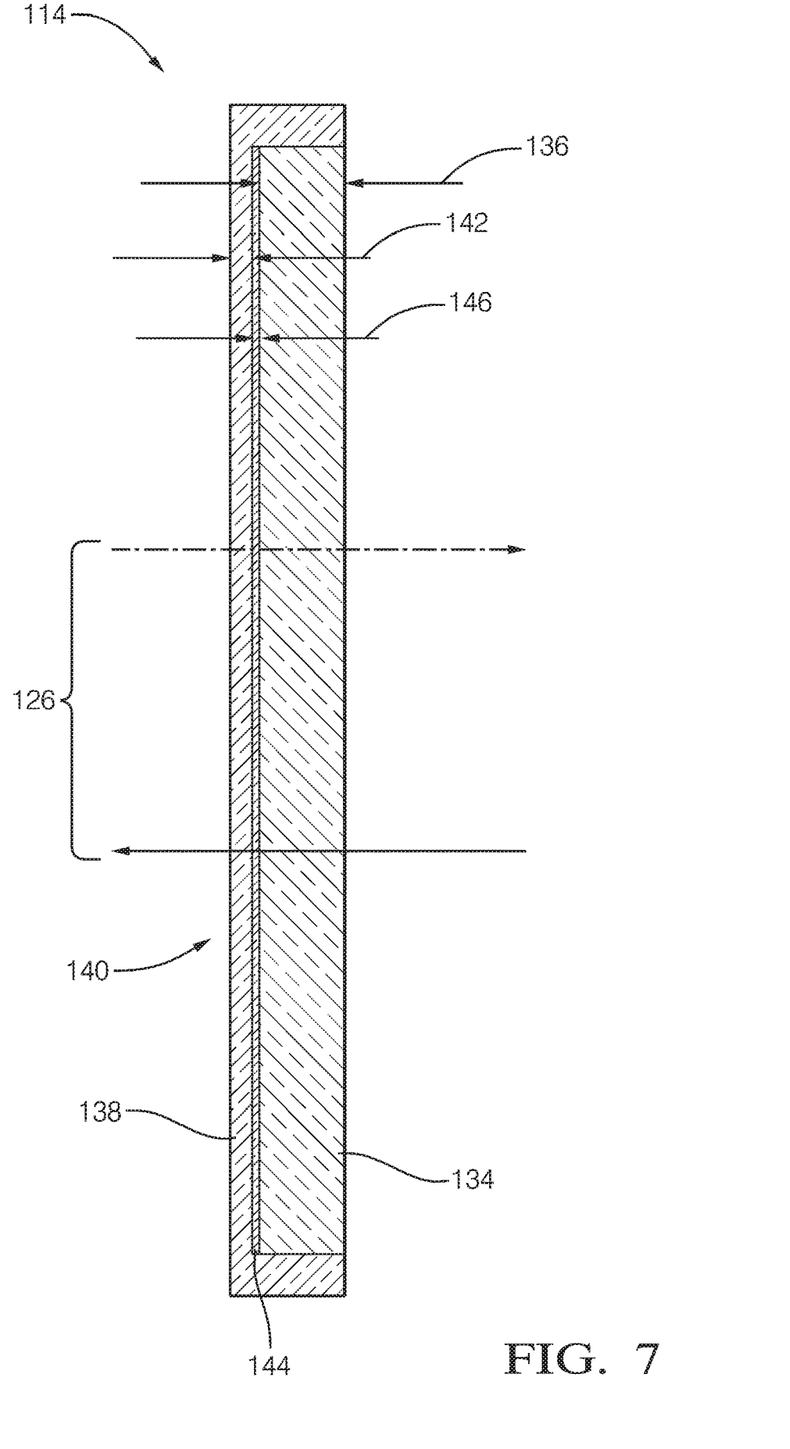
FIG. 7 is a section view of the window of FIG. 6 in accordance with another embodiment.

FIG. 7 illustrates the section-view of the window 114 isolated from the housing 112 of FIG. 6. The first-layer 134 is comprised of a rigid transparent substrate having a first-thickness 136 of between 0.5 mm and 3.0 mm. The rigid transparent substrate may be any rigid transparent substrate suitable for optical applications, including polycarbonate, cyclic olefin copolymer plastics (COC-plastics), glass (e.g. aluminosilicate glass), or transparent ceramic (e.g. sapphire). In the example illustrated in FIG. 7, the rigid transparent substrate is sapphire with the first-thickness 136 of 2.0 mm. The second-layer 138 defines an outer-surface 140 of the enclosure 110 and is comprised of a silicone-based polymeric material having a second-thickness 142 of between 0.5 mm and 3.0 mm. In the particular example illustrated in FIG. 7, the second-layer 138 is a transparent polydimethylsiloxane material having a Shore A durometer of not greater than 85 with the second-thickness 142 of 1.0 mm. One such material is the Dow Corning® MS-4022 Moldable Silicone, manufactured by the Dow Corning Corporation, of Midland, Mich., USA. The second-layer 138 may encase a portion or all of the edges of the first-layer 134 as illustrated in FIG. 7, or alternatively, may not cover the edges of the first-layer 134. The window 114 is characterized as having the zero degree incident-angle transmittance 128 of at least 80% at the wavelength 130 of 1550 nanometers (see FIG. 3). Anti-reflective coatings may also be applied to an interior-surface of the window 114 to further increase the transmittance 128.

In the examples illustrated in FIGS. 6 and 7, the window 114 is characterized as having a flat or planar shape. The window 114 may also be characterized as having a convex-curvature (i.e. curved away from an interior of the housing 112—not shown), or may be characterized as having a concave-curvature (i.e. curved in toward the interior of the housing 112—not shown). The planes of curvature may be in any of the two planes that are transverse to the longitudinal-axis 118. The convex-curvature and/or the concave-curvature provide a technical benefit of enabling the mounting of the enclosure 110 in a body-member of the automobile where the body-member has a curved-surface.

Referring back to FIG. 7, the window 114 may also include a third-layer 144 disposed between the first-layer 134 and the second-layer 138, having a third-thickness 146 of between 0.5 mm and 0.15 mm. The third-layer 144 may be formed of a silicone-based material or a urethane-based material, that improves the bond between the first-layer 134 and the second-layer 138 by accommodating the mismatch in TCE. One skilled in the art may determine the appropriate third-layer 144 material based on the material properties of the first-layer 134 and second-layer 138.

Accordingly, an enclosure 10 is provided. The enclosure 10 is beneficial because the enclosure 10 houses a LIDAR-sensor 16 and is resistant to damage from roadway debris.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

I claim:

1. An enclosure, comprising:
   a housing configured to retain a LIDAR-sensor; and
   a window attached to the housing within an opening defined by the housing, the window configured to transmit light from the LIDAR-sensor, the window comprised of a silicone-based polymeric material having a thickness of at least three millimeters and characterized as having a transmittance of at least 80% of the light at a wavelength of 1550 nanometers.

2. The enclosure in accordance with claim 1, wherein the window is attached to the housing using a silicone-based adhesive, said housing formed of an aluminum-based alloy.

3. The enclosure in accordance with claim 1, wherein the window is characterized by a convex-curvature.

4. The enclosure in accordance with claim 1, wherein the window is characterized by a concave-curvature.

5. The enclosure in accordance with claim 1, wherein the window is formed of a transparent polydimethylsiloxane material having a Shore A durometer of not greater than 85.

6. The enclosure in accordance with claim 5, wherein the window is characterized as having a chip rating number of 10 per SAE standard J400_2012-10.

7. An enclosure, comprising:
   a housing configured to retain a LIDAR-sensor; and
   a window attached to the housing within an opening defined by the housing, the window configured to transmit light from the LIDAR-sensor, the window including a first-layer oriented toward an interior of the housing and a second-layer overlaying the first-layer and oriented toward an exterior of the housing, the first-layer comprised of a rigid transparent substrate having a first-thickness of between 0.5 mm and 3.0 mm, the second-layer defining an outer-surface of the enclosure comprised of a silicone-based material having a second-thickness of between 0.5 mm and 3.0 mm, wherein the window is characterized as having a transmittance of at least 80% of the light at a wavelength of 1550 nanometers.

8. The enclosure in accordance with claim 7, wherein a third-layer is disposed between the first-layer and the second-layer.

9. The enclosure in accordance with claim 8, wherein the third-layer is formed of another silicone-based material.

10. The enclosure in accordance with claim 9, wherein the third-layer has a third-thickness of between 0.5 mm and 0.15 mm.

11. The enclosure in accordance with claim 7, wherein the window is attached to the housing using a silicone-based adhesive, said housing formed of an aluminum-based alloy.

12. The enclosure in accordance with claim 7, wherein the window is characterized by a concave-curvature.

13. The enclosure in accordance with claim 7, wherein the window is characterized by a convex-curvature.

14. The enclosure in accordance with claim 7, wherein the second-layer is formed of a transparent polydimethylsiloxane having a Shore A durometer of not greater than 85.

15. The enclosure in accordance with claim 7, wherein the window is characterized as having a chip rating number of 10 per SAE standard J400_2012-10.

16. An enclosure, comprising:
a housing configured to retain a LIDAR-sensor; and
a window attached to the housing within an opening defined by the housing, the window configured to transmit light from the LIDAR-sensor, the window including a first-layer oriented toward an interior of the housing and a second-layer overlaying the first-layer and oriented toward an exterior of the housing.

17. The enclosure in accordance with claim 16, wherein the first-layer comprised of a rigid transparent substrate.

18. The enclosure in accordance with claim 16, wherein the first-layer has a first-thickness of between 0.5 mm and 3.0 mm.

19. The enclosure in accordance with claim 16, wherein second-layer defines an outer-surface of the enclosure.

20. The enclosure in accordance with claim 16, wherein second-layer is comprised of a silicone-based material.

21. The enclosure in accordance with claim 16, wherein second-layer has a second-thickness of between 0.5 mm and 3.0 mm.

22. The enclosure in accordance with claim 16, wherein the window is characterized as having a transmittance of at least 80% of the light at a wavelength of 1550 nanometers.

* * * * *